(12) United States Patent
Bennis (10) Patent No.: US 9,622,464 B2
(45) Date of Patent: Apr. 18, 2017

(54) VISIBILITY FOR FISHING FLOATS

(71) Applicant: Gary Bennis, Eau Claire, WI (US)

(72) Inventor: Gary Bennis, Eau Claire, WI (US)

( * ) Notice: Subject to any disclaimer, the term of this patent is extended or adjusted under 35 U.S.C. 154(b) by 0 days.

(21) Appl. No.: 14/071,818

(22) Filed: Nov. 5, 2013

(65) Prior Publication Data

US 2014/0053450 A1 Feb. 27, 2014

Related U.S. Application Data

(62) Division of application No. 13/076,132, filed on Mar. 30, 2011, now Pat. No. 8,572,886.

(51) Int. Cl.
*A01K 75/02* (2006.01)
*A01K 93/02* (2006.01)
*A01K 93/00* (2006.01)

(52) U.S. Cl.
CPC .............. *A01K 93/02* (2013.01); *A01K 93/00* (2013.01)

(58) Field of Classification Search
USPC .................................................... 43/17, 17.5
See application file for complete search history.

(56) References Cited

U.S. PATENT DOCUMENTS

| | | | | |
|---|---|---|---|---|
| 4,607,449 A * | 8/1986 | Brachear | ................ | A01K 91/06 43/42.22 |
| 5,207,013 A * | 5/1993 | Bartok | .................... | A01K 93/00 43/4 |
| 6,092,325 A * | 7/2000 | Walker | ................... | A01K 89/08 215/211 |
| 6,671,994 B1 * | 1/2004 | Klein | ..................... | A01K 93/02 43/17 |
| 6,763,629 B1 * | 7/2004 | Bennett | ................. | A01K 91/10 43/15 |
| 7,047,687 B2 * | 5/2006 | Liu | ......... | A01K 93/02 43/17 |
| 8,434,257 B2 * | 5/2013 | Arias | ..................... | A01K 89/08 43/4 |
| 2007/0227058 A1 * | 10/2007 | Adams | .................. | A01K 93/02 43/17.5 |
| 2014/0150328 A1 * | 6/2014 | Harrell | .................. | A01K 93/02 43/17 |

FOREIGN PATENT DOCUMENTS

GB 2244196 A * 11/1991 ............. A01K 93/02

* cited by examiner

*Primary Examiner* — Christopher P Ellis
(74) *Attorney, Agent, or Firm* — McNeely, Hare & War, LLP; William D. Hare (57) ABSTRACT

The invention relates to a line of floats which allow for greater visibility during both day and night fishing. The greater visibility is created by a combination of one of more marker devices, including light sticks, flags, viz sticks, reflective surface, and/or use of chemiluminescent and phosphorescent materials. These objects and materials are used on a variety of floats, especially large floats such as jug floats and a new type of float termed a noodle float. These large floats are especially useful for catching large catfish and can be used in any body of water where fish are found, such as lakes, rivers, ponds, and the sea.

20 Claims, 9 Drawing Sheets

VISIBILITY FOR FISHING FLOATS

CROSS REFERENCE TO RELATED APPLICATIONS

This application is a divisional of U.S. application Ser. No. 13/076,132 filed on Mar. 30, 2011, the contents of which are incorporated herein in their entirety by reference.

TECHNICAL FIELD

The field of the invention generally relates to articles to increase the visibility of fishing floats in both day and night fishing.

BACKGROUND

Anglers will often fish at night with floats that are visible based on the attachment of a chemical or battery powered light stick. These floats are visible based on the light emitted by the light sticks but their visibility will diminish over time as the chemical ingredients are used up or the battery strength is reduced. During the day, the light sticks will have little ability to impart visibility to the float.

Amongst the floats anglers use when fishing for catfish are large jug floats, which are shaped much like their name suggests. The float is jug shaped with the jug oriented downward and a handle positioned on the flat upper surface. The fishing line passes through the bottom portion and may extend to a fishing rod/reel or may extend only from the jug to a hook. Anglers will bait the hook with the free end of the line attached to the jug. The jug is placed in the water in the evening when fish are feeding and either tracked during the night or retrieved in the morning. There is a need to improve the visibility of the float during both the day and the night.

SUMMARY

In one general aspect, a substantially hollow fishing float is provided in the shape of a jug. The fishing float has a top end having an upper outer surface and a lower circumferential edge; a handle integrally connected to the upper outer surface of the top end; a middle section; a neck; and a bottom end.

The middle section is generally cylindrical in shape and has an inner surface, an outer surface, an upper circumferential edge and a lower circumferential edge. The upper circumferential edge of the middle section is integrally connected to the lower circumferential edge of the top section.

The neck has a substantially tapered outer surface with an upper circumferential edge and a lower circumferential edge, the upper circumferential edge being larger in circumference than the lower circumferential edge. The upper circumferential edge of the neck is integrally connected to the lower circumferential edge of the middle section. The bottom end has an upper circumferential edge which is integrally connected to the lower circumferential edge of the neck. The bottom end has a removable closure.

A circular band overlies the outer surface of the middle section. The circular band has an inner surface and an outer surface and is configured such that the inner surface overlies the outer surface of the middle section. The circular band has one or more holding members with each holding member having an opening to a channel configured to receive a tubular shaped marker device. Each holding member extends along the outer surface of the circular band with the one or more channels having an inner surface.

The float has an opening extending from the neck and/or bottom end that is configured for receiving a fishing line. One or more marker devices are positioned within the one or more holding members such that a portion of an outer surface of the one or more marker devices is positioned within the channel.

Embodiments of the jug shaped fishing float may include one or more of the following features. For example, the opening for receiving the fishing line may include an opening through a generally flat member extending outwardly from the neck or bottom end. The opening for receiving the fishing line may include a tube having a longitudinal channel through the tube and being mounted to the outer surface of the neck and/or bottom end. The opening for receiving the fishing line may be a tubular member having two ends, wherein each end is integrally connected to the outer surface of the neck and/or bottom end.

The handle may be free of any marker device.

The fishing float may include three holding members positioned along the outer surface of the circular band such that each holding member is separated by approximately 120°.

The one or more channels may be oriented parallel to the longitudinal axis of the fishing float. The one or more channels may be oriented at an angle to the longitudinal axis of the fishing float.

The height of the fishing float may be from about 7 inches to about 11 inches as measured from a bottom surface of the bottom end to the upper surface of the handle and the diameter of the top end, middle section, and upper circumferential edge of the neck may be from about 3 inches to about 6 inches, and the diameter of the lower circumferential edge of the neck and the bottom end may be from about 0.5 inches to about 3 inches.

In another general aspect there is provided a fishing float in the shape of a tubular noodle. The fishing float includes a tube section having an upper end, a lower end, an outer surface, and a channel extending longitudinally through at least a portion of the length of the tube section. The tube section is substantially cylindrical in shape. The fishing float also includes a top section having an inner surface and an outer surface, the top section being configured to fit around the circumferential surface of the tube section such that the inner surface of the top section overlies the outer surface of the tube section. The top section includes one or more holding members, each holding member having an opening to a channel configured to receive a tubular shaped marker device. Each holding member extends along the outer surface of the top section. The one or more channels each have an inner surface.

The fishing float may optionally include one or more marker devices positioned within the one or more members such that a portion of an outer surface of the one or more marker devices is positioned within the channel The fishing float also includes a handle made of a rigid material and having a grasping portion, a rod portion, and a baiting portion, the rod portion extending through the channel of the tube section with the grasping portion protruding through the upper end of the tube section and the baiting portion protruding through the lower end of the tube section. Both the grasping portion and baiting portion are configured to limit movement of the handle into and through the channel.

Embodiments of the tubular shaped fishing float may include one or more of the following features. For example, the grasping portion may be free of any marker device.

The fishing float may have three holding members positioned along the outer surface of the top section such that each holding member is separated by 120°.

The one or more channels in the holding member may be oriented parallel to the longitudinal axis of the fishing float. The one or more channels in the holding members may be oriented at an angle to the longitudinal axis of the fishing float.

The top section of the fishing float may overlie the upper end of the tube section such that the upper end of the tube section is substantially covered. The top surface of the top section may include a slit through which the grasping portion protrudes.

The tube section may be made of one or more of a foam material and/or a hollow plastic tube.

The one or more marker devices may be one or more of light sticks, flags, viz sticks, reflective surfaces, and/or chemiluminescent and phosphorescent materials. The one or more marker devices may be a flag and a light stick mounted to the top thereof.

The tube section may have a length of from about 12 inches to about 24 inches and a diameter of from about 1 inch to about 5 inches.

The details of various embodiments of the invention are set forth in the accompanying drawings and the description below. Other features and advantages of the invention will be apparent from the description, the drawings, and the claims.

DETAILED DESCRIPTION

The inventor has developed a line of floats which allow for greater visibility during both day and night fishing. The greater visibility is created by a combination of one of more marker devices, including light sticks, flags, viz sticks, reflective surface, and/or use of chemiluminescent and phosphorescent materials. These objects and materials are used on a variety of floats, especially large floats such as jug floats and a new type of float termed a noodle float. These large floats are especially useful for catching large catfish and can be used in any body of water where fish are found, such as lakes, rivers, ponds, and the sea.

Figures 1A, 1B:
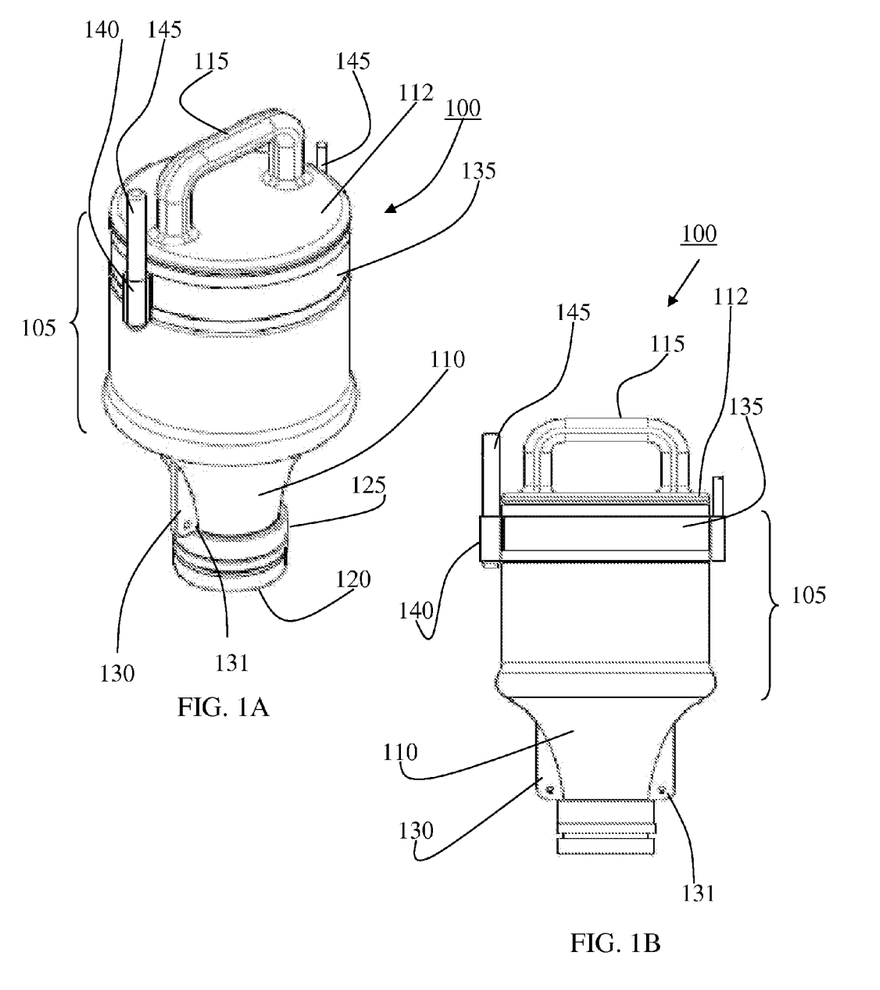
FIG. 1A is a perspective view of a jug float having light sticks.
FIG. 1B is a front view of the jug float illustrated in FIG. 1A.
Figure 1C:
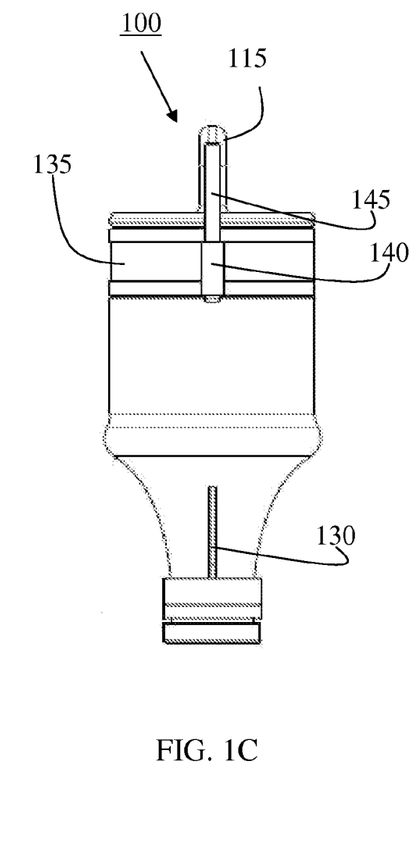
FIGS. 1C and 1D are a side view and a cross-section side view of the jug float illustrated in FIG. 1A.

FIGS. 1A-C illustrate a jug float 100 with FIG. 1A being a perspective view of the jug float and FIGS. 1B and 1C being front and side views, respectively. The jug float 100 includes an upper end 112, a middle section 105, a neck 110, and a bottom end 125. The upper end 112 has a handle 115 which is secured on and extends from the upper outer surface of the upper end 112. The handle 115 may be secured to the upper outer surface of the upper end 112 by any conventional means known to one of ordinary skill in the art. For example, the handle may be integrally formed with the upper end, such as by injection or blow molding. The handle may span the diameter of the upper end or a portion of the upper end, as illustrated in FIG. 1A.

The handle is intended to be used by an angler to grasp the jug float especially if there is a fish attached to a fishing line extending from the float. Therefore, the handle is configured such that the angler can easily grasp and hold the float. If the angler is trying to grasp the float when a fish is caught, the fish will likely be moving the line and jug float to a sufficient extent that the angler must have unobstructed access to the handle. For this reason, the inventor has determined that there are significant advantages to keeping any marker devices off of the handle or avoiding having any marker device too close to the handle and instead attaching the marker devices to the circumference of the float, as described in greater detail below. Therefore, in one implementation, the handle is free of any marker devices or other fishing implements that could impede the ability of the angler to grasp the handle.

The handle can be configured to be more readily visible to an angler than if the handle was merely present solely for its utility to grasp the float. To make the handle more visible, it can have a reflective surface, such as by application of a reflective tape or coating. This may be useful if the handle is the most prominent feature noticeable when in use. In another implementation, the handle can be made of a clear plastic material and a chemiluminescent light stick inserted into an opening in the handle. In another implementation, the handle can be made of a phosphorescent material so that it glows in the dark.

The middle section 105 includes a band 135 which is configured such that the inner circumferential surface of the band 135 overlies the outer circumferential surface of the middle section 105. The band 135 may be secured at any point along the length of the middle section 105 and may be removable from the middle section 105 or permanently fixed to the middle section 105. The band 135 may be formed of a variety of materials, including plastics, such as polyvinyl chloride; elastomeric polymers, such as rubber, nylon, urethane, polyurethane and mixtures thereof; and/or phosphorescent or chemiluminescent materials which glow in the dark. When the band 135 is removable from the middle section 105, it may be re-secured to the middle section 105 using a variety of methods, such as by using a locking mechanism to secure the band in place or sliding the band up the length of float 100 and securing the band in place by way of its elastic properties. The band also may be in the form of an unclosed rigid plastic ring that may be expanded slightly to fit over the middle section 105 and then allowed to snap shut securely against the middle section. In these implementations, the band 135 may have a reflective surface, or may be imparted a reflective surface by applying on all or part of the band a reflective tape or coating.

FIG. 1A illustrates the band 135 containing one or more holding members or light stick holders 140 which extend along the outer circumferential surface of the band 135. Each holding member or holder has an opening to a channel configured to receive a tubular shaped marker device. While FIG. 1A illustrates the presence of two light stick holders 140, any number of light stick holders may be incorporated to extend along the outer circumferential surface of the band 135. Each light stick holder 140 is configured to hold a light stick 145, which may emit light by any conventional means known to one of ordinary skill in the art, such as by battery or chemical substance. The holder 140 may also be used to hold any other tubular shaped marker device that is used to help an angler locate the float.

The neck 110 is configured such that its upper circumferential edge is mated with the lower circumferential edge of the middle section 105 and the lower circumferential edge of the neck is mated with the upper circumferential edge of a bottom end 125. The neck 110 has a substantially tapered surface such that the upper circumferential edge is larger in circumference than the lower circumferential edge. One or more of the top section, middle section, neck and bottom end may be formed as a single piece, such as by injection or blow molding.

The bottom end 125 is configured such that its circumferential lower edge mates with the circumferential upper edge of a closure 120. Preferably, the bottom end 125 has a threaded portion to accommodate a removable screw cap-type closure 120. The bottom end may also be of sufficient length that a weight can be placed around the end to alter the buoyancy of the float. One or more fins 130 extend radially from the outer surface of the neck 110 and contain one or more openings or holes 131 through which any conventional fishing line may pass. Instead of or in addition to the fins 130, the float can be provided with tubular members mounted to the bottom end or neck. The tubular members have a channel through which the fishing line passes.

The inside of neck 110 may also include a weight which allows the jug float to sit upright in the water. Alternatively, the neck 110 does not contain an additional weight and the float can sit sideways in the water when in use.

Figure 1D:
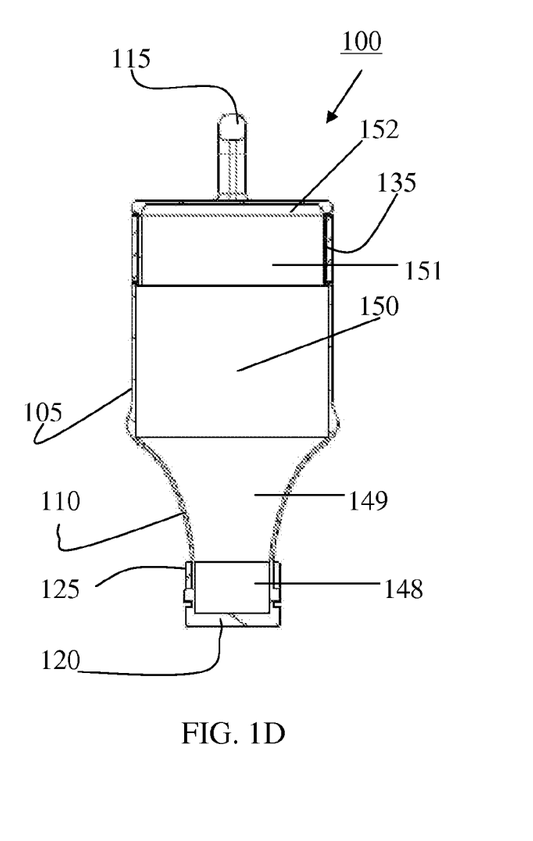

FIG. 1D is a cross-sectional side view of the jug float 100. The top section contains a hollow portion 152. The middle section 105 contains hollow portions 150 and 151, and the neck contains a hollow portion 149. The bottom end 125 contains a hollow portion 148. This figure illustrates that the inside cavity of the jug float is a single hollow chamber that is accessed by removing the closure 120. The closure 120 may be removed, water introduced into the chamber, and the closure reapplied in order to alter the buoyancy of the float.

Figure 1E:
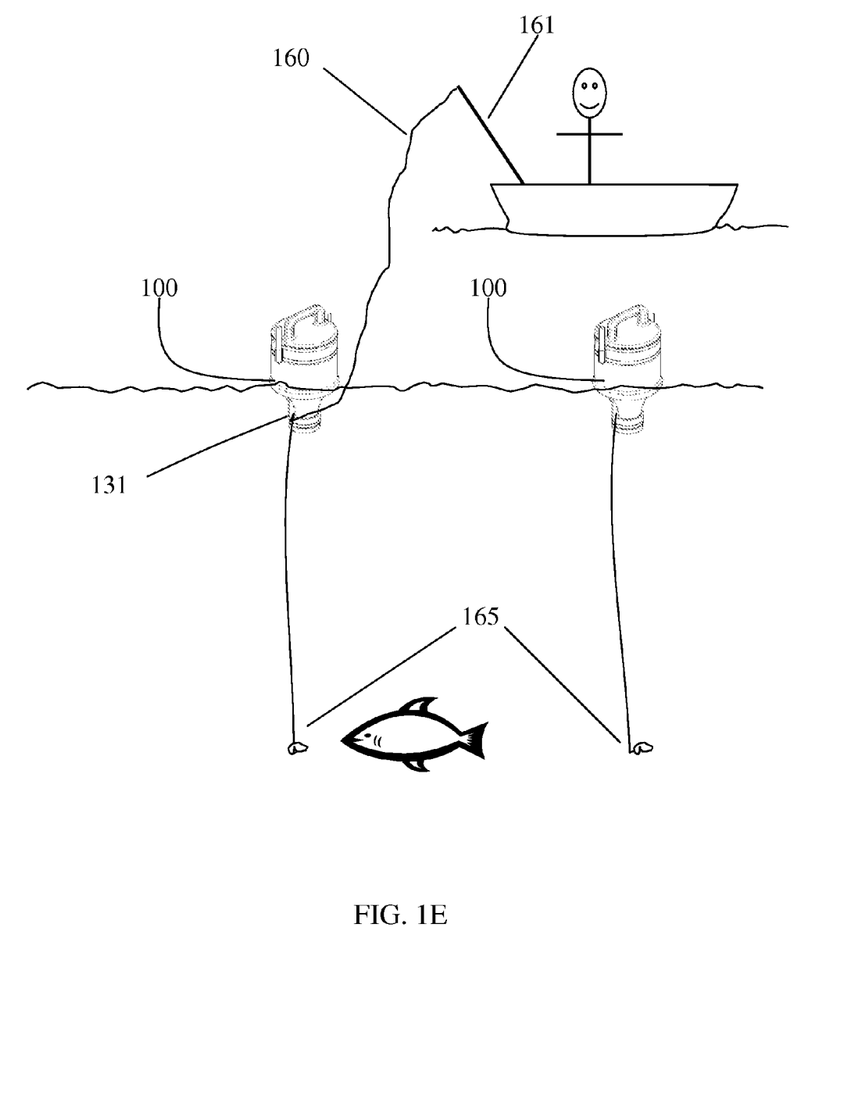
FIG. 1E is an illustration of the use of the jug floats of FIG. 1A used in fishing.

As shown in FIG. 1E, a fishing line secured with bait 165 is threaded through the hole 131 of the jug float 100. In practice, an angler may attach bait to a plurality of jug floats and wait for one or more of the jug floats to catch a fish, which may be apparent by observing the bobbing or downward tugging of the jug float in the water. The presence of the marker devices used in conjunction with the jug float allows for greater visibility of the jug floats in the water, thus helping the angler keep track of the numerous jug floats that have been set or cast out into the water. The angler may remove the jug floats by grasping the handle 115, thereby retrieving the fish which is attached to the baited fishing line. The unique placement of marker devices along the band 135 as opposed to the handle or upper end allows for unencumbered grasp of the jug float by the angler.

In another embodiment, the jug float 100 may be secured to a fishing rod 161 through a fishing line 160. In practice, an angler may secure the fishing line to the jug float 100 by looping it through the hole 131 of the jug float several times or forming a knot, and allowing additional length of fishing line to attach bait such that one end of the fishing line is secured to the fishing rod and the other end of the same fishing line is baited and in the water. Once a fish is caught, the angler is then able to reel the jug float and fish to the boat in any conventional manner as is known in the art. The angler may alternatively attach a fishing line from the fishing rod to the jug float by passing the line through the hole 131 and securing it there, while using a separate fishing line to attach the bait to the jug float using the same or a different hole of the jug float, as is shown in FIG. 1E.

The jug float 100 may have dimensions which are suited for catching large catfish. For example, the jug float may have a height of from about 8 inches to about 24 inches as measured from the bottom surface of the closure 120 to the top surface of handle 115. The upper end and middle section may have a cross sectional diameter of from about 4 inches to about 12 inches. The upper circumferential edge of the neck 110 may have a cross sectional diameter of about 4 inches to about 12 inches, and the lower circumferential edge of the neck 110 may have a cross sectional diameter of from about 1 inch to about 10 inches.

Figure 2A:
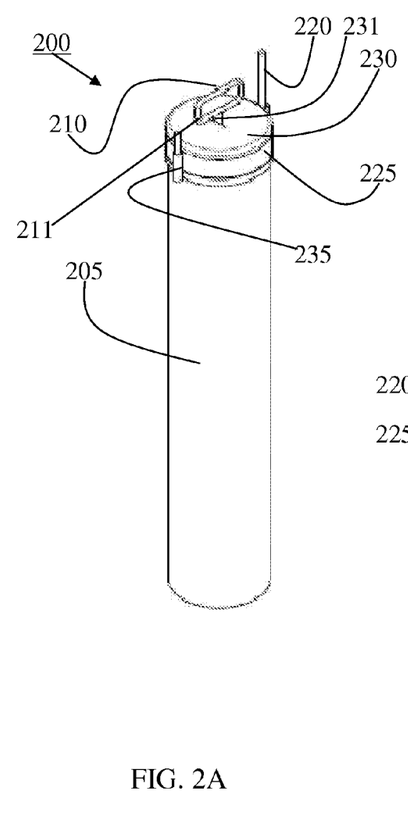
FIG. 2A is a perspective view of a noodle float having light sticks mounted to the float.

FIG. 2A is a perspective view of a second embodiment of the invention, termed a noodle float 200. The noodle float is generally a foam tube with one or more marker devices such as light sticks, flags, viz sticks, reflective surface, and/or chemiluminescent and phosphorescent materials which can be cast or placed in the water by an angler and be easily visible to the angler during the night or day. The noodle float can be used in both night and day fishing and is of sufficient size so as to be used when fishing for larger fish, in particular large catfish. The noodle float is designed such that it sits on its side along its longitudinal plane while in the water and once a fish has been caught, the orientation of the noodle float will become upright, thus alerting the angler that a fish has been caught. The one or more marker devices are also useful in alerting the angler that a fish has been caught.

Figure 2B:
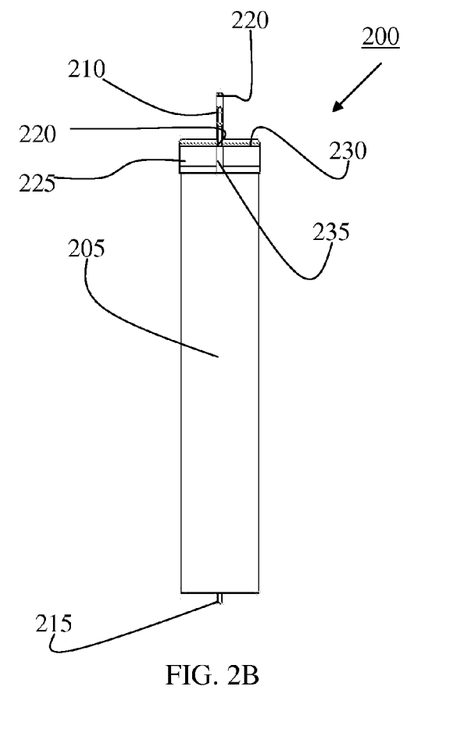
FIG. 2B is a front view of the float of FIG. 2A.
Figures 2C, 2D, 2E:
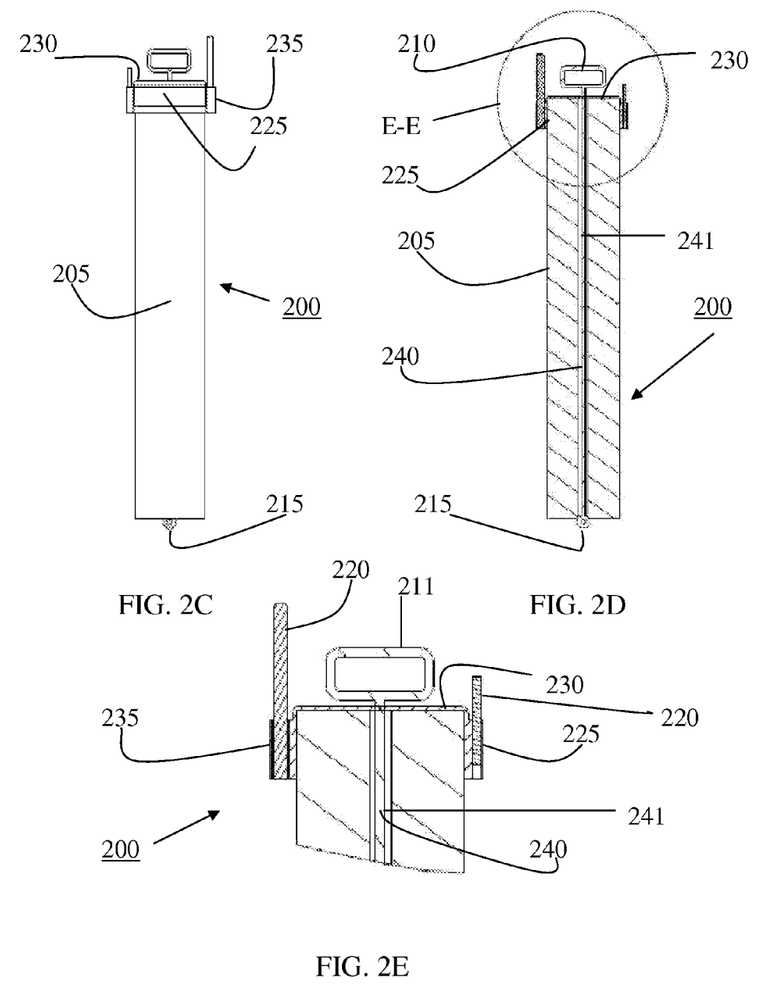
FIGS. 2C and 2D side and cross-sectional side views of the float of FIG. 2A.
FIG. 2E is an enlarged cross-sectional side view of the float of FIG. 2A taken at section line "E-E" of FIG. 2D.

FIGS. 2A-C illustrate the noodle float 200 with FIG. 2A being a perspective view, FIG. 2B being a front view, and FIG. 2C being a side view. The noodle float 200 includes a top section 230 and a tube section 205.

The top section 230 is configured such that its lower circumferential edge mates with the upper circumferential edge of the tube section 205. The top section 230 may be removable from tube section 205, or may be permanently fixed to tube section 205. The top section 230 may either contain an upper surface which substantially covers the top surface of tube section 205, or top section 230 may be void or partially void of an upper surface which renders the top surface of the tube section 205 completely or partially uncovered. When the top section 230 contains an upper surface which covers the top surface of tube section 205, the upper surface of top section 230 may have a slit 231 out of which a handle 210 can extend.

The top section 230 may be formed of a variety of materials or mixtures of materials, including plastics, such as polyvinyl chloride; elastomeric polymers, such as rubber, nylon, urethane, polyurethane and mixtures thereof; and/or phosphorescent or chemiluminescent materials which glow in the dark. When the top section is removable from the tube section, it may be re-secured to the tube section 205 using a variety of methods, such as by using a locking mechanism to secure the top section in place or sliding the top section on the upper surface of the tube, securing the top section in place by way of its elastic properties. The top section preferably has a reflective surface, or may be imparted a reflective surface by applying on all or part of the top section a reflective tape or coating 225.

The top section 230 can also be in the form of a band which may be secured at any point along the length of the tube section 205 and may be removable from the tube section 205 or permanently fixed to the tube section 205. When top section 230 is in the form of a band, it may contain one or more holding members or light stick holders 235, as is described below. Each holding member has an opening to a channel configured to receive a tubular shaped marker device.

FIG. 2A illustrates the top section 230 containing one or more light stick holders 235 which extend along the outer circumferential surface of the top section 230. While FIG. 2A illustrates the presence of two light stick holders 235, any number of light stick holders may be incorporated to extend along the outer circumferential surface of the top section 230. Each light stick holder 235 is configured to hold a light stick 220, which may emit light by any conventional means known in the art, such as by battery or chemical substance. The light stick holders may be oriented such that the light stick which sits within the holder is parallel with the axial plane of the tube section 205. In another embodiment, the light stick holders 235 may be configured such that the light stick which sits within the holders point in a direction perpendicular to the axial plane of the tube section 205, such that if the float is left turned on its side in the water as opposed to upright, one or more light sticks are perpendicular to the water surface pointing upwards.

In another embodiment, the light stick holders may be oriented at an angle between collinear with the longitudinal axis and perpendicular to the longitudinal axis. If the float is resting on its side or upright in the water, a light stick will be oriented generally upward. It three light stick holders are positioned equidistant around the circumference of the float, at least one float will always be positioned upright out of the water if the float is positioned on its side in the water.

As best illustrated in FIGS. 2D and 2E, the handle comprises a rod portion 240, a grasping portion 211, and a baiting portion 215. The handle may span the diameter of the top section or a portion of the top section, as illustrated in FIG. 2A. The handle is intended to be used by an angler to grasp the noodle float especially if there is a fish attached to a fishing line extending from the float. Therefore, the handle is configured such that the angler can easily grasp and hold the float. If the angler is trying to grasp the float when a fish is caught, the fish will likely be moving the line and noodle float to a sufficient extent that the angler must have unobstructed access to the handle. For this reason, the inventor has determined that there are significant advantages to keeping any marker devices off of the handle or away from the handle and instead attaching the marker devices to the circumference of the float, as described in greater detail herein. The handle may also be used for attaching a fishing line connected to a fishing rod, such that when a fish is caught, the angler can reel in the noodle float and fish together as known in the art. For example, the angler may use a heavy duty line which is tied to the handle on one end and secured to a fishing rod on the other end.

The handle is preferably made of a strong, rigid material including metals, such as stainless steel and aluminum, and/or plastics, such as polyvinyl chloride, nylon, polypropylene, etc. The handle is positioned within the tube section 205 such that the rod portion 240 extends axially through a channel 241 passing through the tube, the channel also extending axially through the length of the tube. The handle 210 is secured to the tube section 205 such that the baiting portion 215 is sufficiently large as to limit the axial movement of the handle within the channel 241 of the tube section. The baiting portion 215 preferably employs a ring or other mechanism by which a fishing line can be attached and bait can thereby be secured to the hook at the end of the fishing line such that the noodle float can be used in catching fish.

While the tube section 205 is preferably made of a buoyant foam material, such as polyurethane foam or closed cell polyurethane foam, the tube section alternatively may be made of any lightweight material which is able to float on the surface of water, such as a hollow plastic material, balsa wood, and the like. For example, the float can be made of a hollow plastic tube or a Styrofoam material. The weight of the material implemented in forming the tube section 205 should be light enough such that it does not drastically add weight to the load when an angler is reeling in a caught fish and float. The buoyancy of the material or float should also be sufficient such that a large fish is unable to completely submerge the float into the water for an extended period of time, thus rendering the float not visible to the angler. The tube section may be hollow or solid. In one embodiment, the tube section has a reflective surface, or may be imparted a reflective surface by applying on all or part of the tube a reflective tape or coating.

Figure 3A:
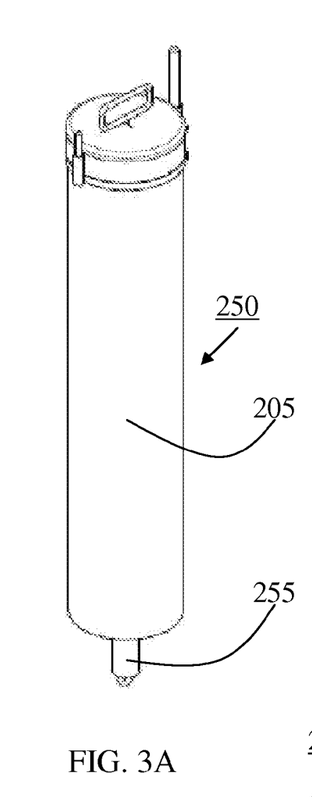
FIGS. 3A, 3B and 3C are perspective, front and cross-sectional views, respectively, of a second embodiment of a noodle float.
Figure 3B:
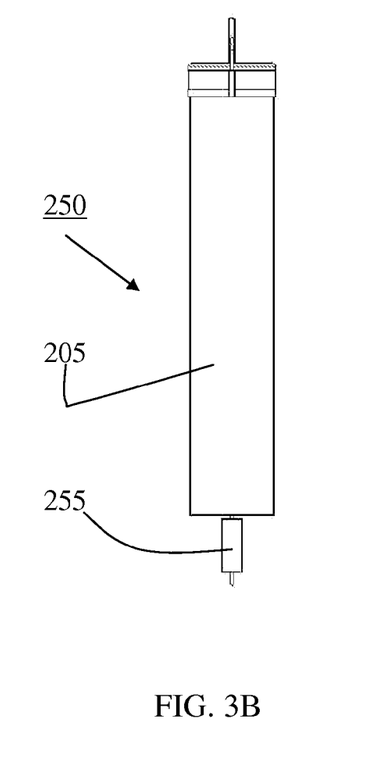
Figure 3C:
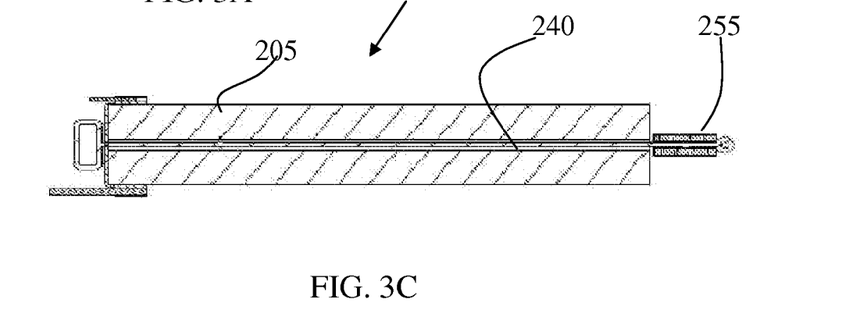

In another embodiment shown in FIGS. 3A-C, a weight 255 may be used in conjunction with a noodle float 250. The weight 255 contains a channel extending along the length of the weight such that the channel accommodates the rod portion 240 of the handle 210. The weight preferably sits between the lower surface of tube section 205 and the baiting portion 215 of the handle 210. The use of a weight in this embodiment allows the noodle float to sit substantially upright in the water and provide increased visibility of the float and its marker devices.

Figure 4A:
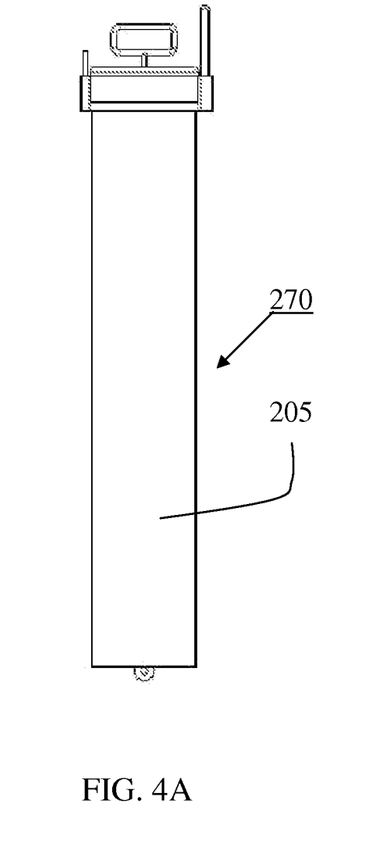
FIGS. 4A and 4B are front and cross-sectional side view of a third embodiment of a noodle float.
Figure 4B:
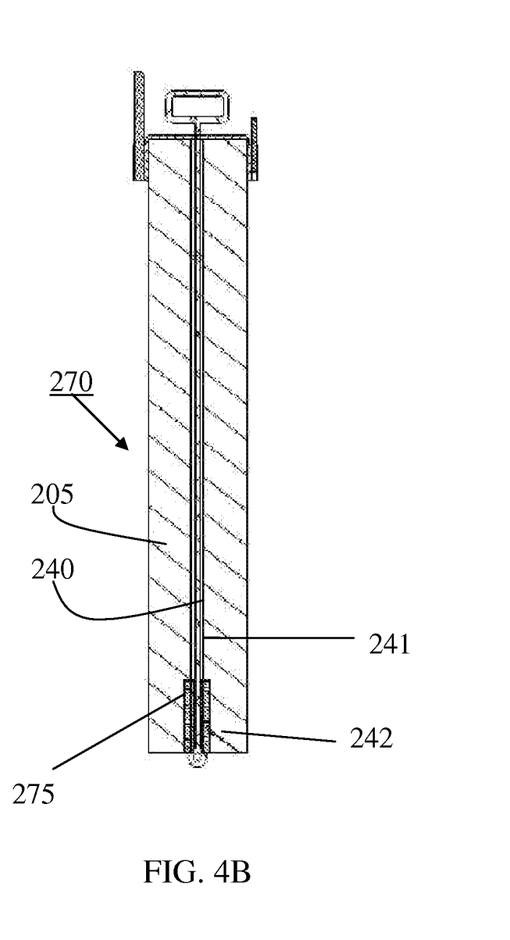

In yet another embodiment, shown in FIGS. 4A-B, a weight 275 may be used in conjunction with a noodle float 270. The weight 275 contains a channel extending along its length which accommodates the rod portion 240 and sits within an enlarged channel portion 242 of the float. The enlarged channel portion 242 is preferably present completely inside of the tube section 205 and can be of any size which allows for the weight 275 to be retained therein. The enlarged channel portion 242 may be located at any point along the axis of tube section 205, but is preferably located at the base of the tube as shown in FIG. 4B.

Figure 5:
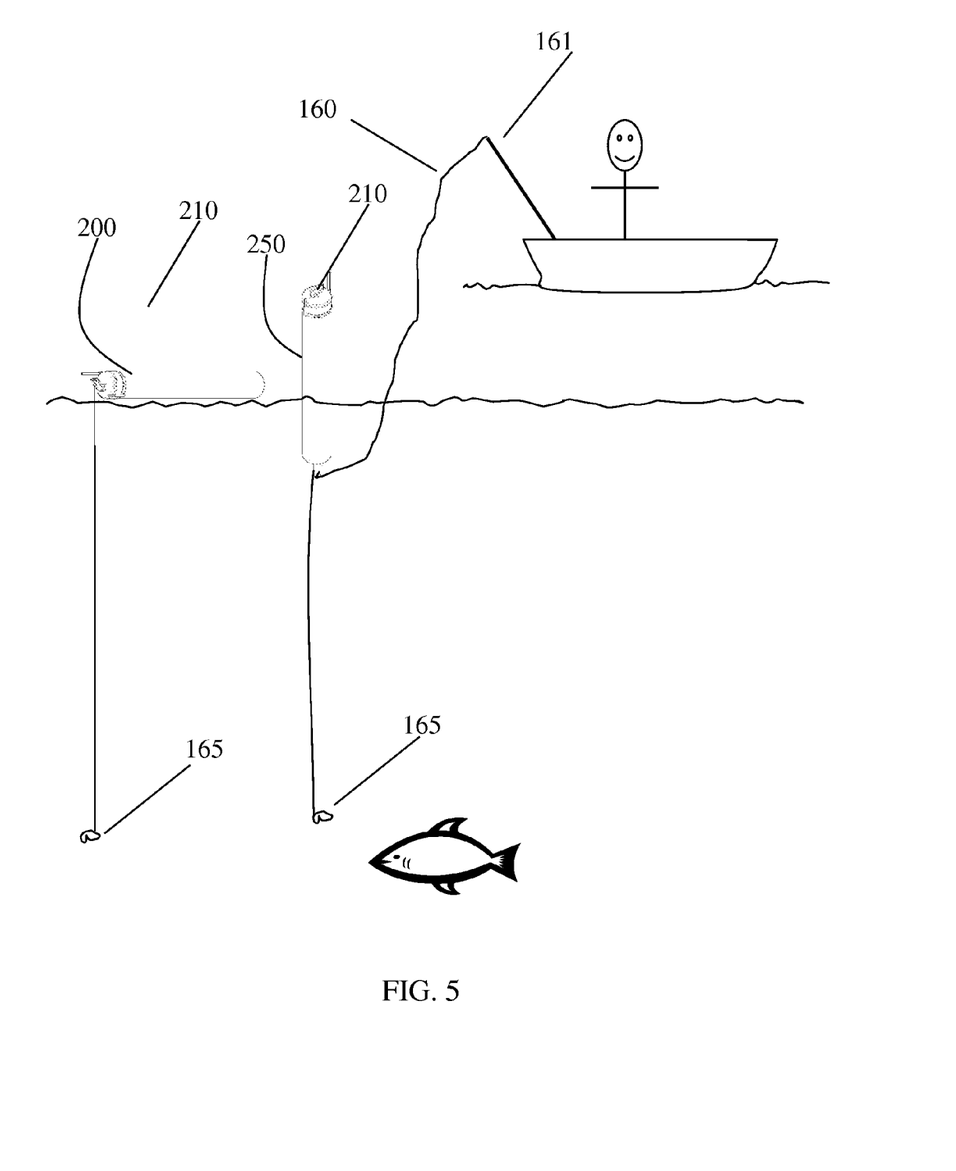
FIG. 5 is a view depicting the use of the noodle floats of FIGS. 2A-E and 3A-C.

As shown in FIG. 5, a fishing line 160 secured with bait 165 is threaded through the ring of the baiting portion 215 of the noodle float 200. In practice, an angler may attach bait to a plurality of noodle floats and wait for one or more of the noodle floats to catch a fish, which is apparent by a change in the orientation of the noodle float from lying sideways on its longitudinal plane to an upright orientation such that the noodle float "pops up" out of the water. Alternatively, the observation of bobbing, downward tugging, or movement of the noodle float may indicate the fish is swimming in a particular direction in the water. The presence of the marker devices used in conjunction with the noodle float allow for greater visibility of the noodle floats in the water, thus helping the angler to keep track of the numerous noodle floats that have been cast or set out into the water. The angler may remove the noodle floats by grasping the handle 210 and winding the fishing line around the tube portion until the fish attached to the other end of the baited fishing line is retrieved. The unique placement of marker devices along the top section 205 as opposed to the handle allows for the unencumbered grasp of the noodle float by the angler.

In another embodiment, the noodle float 250 may be secured to a fishing rod 161 through a fishing line 160. The fishing line 160 may be attached to either the baiting portion 215 of the noodle float, or the grasping portion 211 of the handle 210. In practice, an angler may secure the fishing line to the noodle float 250 by either passing it through the ring of baiting portion 215 several times or knotting it to the ring. The angler would allow an additional length of fishing line to attach bait such that one end of the fishing line is secured to the fishing rod and the other end of the same fishing line is baited and in the water. Once a fish is caught, the angler is then able to reel the noodle float and fish to the boat. The angler may alternatively attach a fishing line from the fishing rod to the noodle float by passing the line through the ring of the baiting portion 215 or grasping portion 211 of handle 210 and securing it there, while using a separate fishing line to attach the bait to the noodle float using the ring of the baiting portion 215, as is shown in FIG. 5. After reeling in the noodle float, the angler may wind the remaining fishing line around the tube portion until the fish attached to the other end of the baited fishing line is retrieved.

Figure 6A:
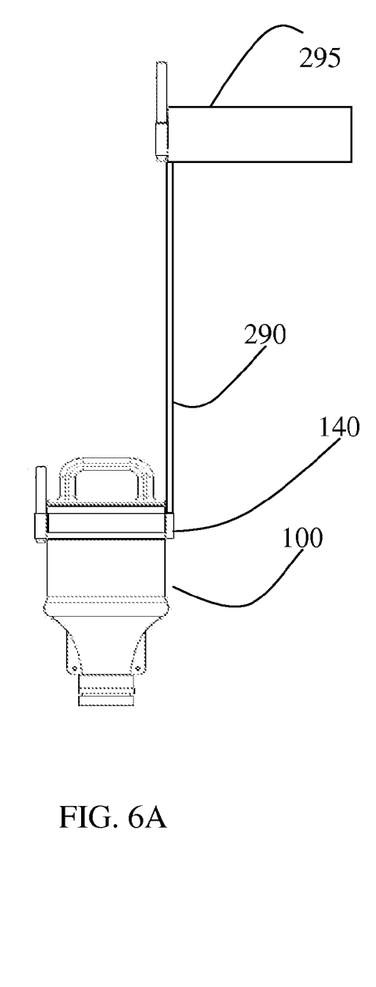
FIGS. 6A and 6B are front views of jug and noodle floats having a flag mounted to the respective float.
Figure 6B:
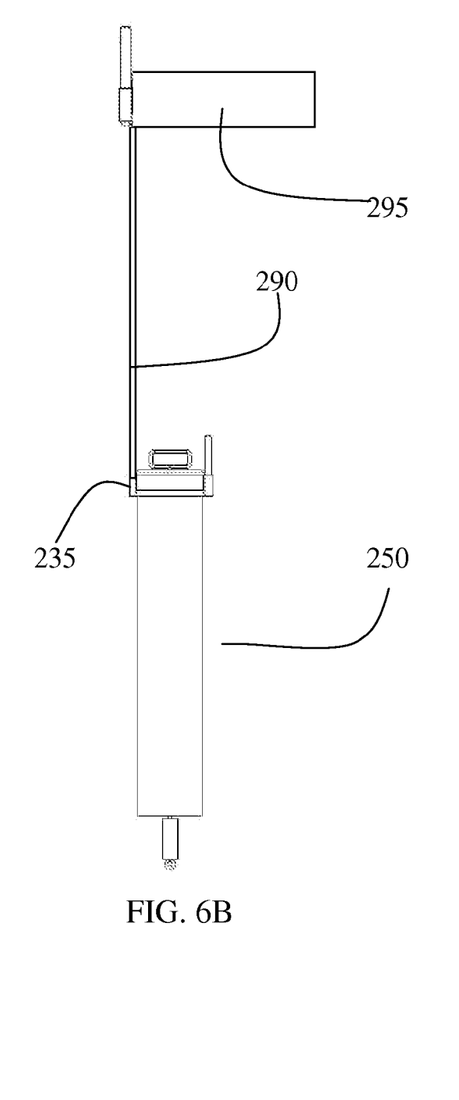

As shown in FIGS. 6A and 6B, the holder members or light stick holders 140 and 235 may alternatively be adapted to hold any device which may aid in the visibility of the float 100 and 250, respectively. These figures illustrate a flag 295, which is secured to the light stick holders 140 and 235 using a rod 290. A light stick or other marker device may be attached or mounted to the flag along its length or at the top. As illustrated in FIGS. 6A and 6B, the rod may include one or more light stick holders into which the light sticks or markers are inserted.

In another implementation, the tube portion 205 of the noodle float may form a variety of shapes along its transverse cross-section, such as a circle (as shown in FIGS. 2A-2E), an oval, a half-oval, a square, a rectangle, a triangle and the like. The tube portion 205 may also form a non-geometric shape along its transverse cross-section. For example, the tube portion 205 may form a half-oval along its transverse cross-section and the flag may be positioned at any point along the curved outer surface of the half oval, such that the flag is always visible above the water, whether a fish is caught or has not yet been caught. For example, when a fish has not yet been caught, the float will lie on the water such that the flat surface of the tube is in contact with the water and the curved surface is exposed to the outside air, with the flag being oriented parallel to the water as well as the longitudinal plane of the noodle float. When a fish has been caught, the noodle float will "pop up" such that the tube and flag become perpendicular to the water surface. This allows for an angler to easily find the float in particular during day time fishing when the use of a light stick does not aid in the visibility of the float. The particular use of a half oval shape for the tube portion 205 ensures that when the light stick holder 235 is secured at a point along the curved outer surface of the half oval, that the flag will always be above the water surface and therefore easily visible to the angler.

The marker devices employed in conjunction with the floats are sufficiently long as to enable an angler to view the marker device from a distance of from about 100 to about 500 feet or more. For example, the flag may have a length of from about 0.5 to about 2 feet, as measured from the bottom to the top of the rod 290 or to the top of the flag 295. The light sticks may have a length of from about 1 to about 6 inches or more. The tube portion of the noodle float may be of any length which is sufficient to enable an angler to easily view the float from a long distance. For example, the length of the tube portion may be from about 9 to about 36 inches.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims

What is claimed is:
1. A fishing float, comprising:
   a. a tube section having an upper end, a lower end, an outer surface, and a channel extending longitudinally through at least a portion of the length of the tube section, wherein the tube section is substantially cylindrical in shape;
   b. a top section having an inner surface and an outer surface, the top section being configured to fit around the upper end of the tube section such that the inner surface of the top section overlies at least a portion of the outer surface of the tube section, wherein the top section comprises one or more holding members, each holding member having an opening to a channel configured to receive a tubular shaped marker device, each holding member extending along the outer surface of the top section, each channel in the holding member having an inner surface;
   c. optionally, one or more marker devices positioned within the one or more holding members such that a portion of an outer surface of the one or more marker devices is positioned within the channel in the holding member; and
   d. a handle being made of a rigid material and having a grasping portion, a rod portion, and a baiting portion, the rod portion extending through the channel of the tube section with the grasping portion protruding through the upper end of the tube section and the baiting portion protruding through the lower end of the tube section.

2. The fishing float of claim 1, wherein both the grasping portion and baiting portion are configured to limit movement of the handle into and through the channel.

3. The fishing float of claim 1, wherein the grasping portion is free of any marker device.

4. The fishing float of claim 1, wherein three holding members are positioned along the outer surface of the top section such that each holding member is separated by 120°.

5. The fishing float of claim 1, wherein the one or more channels are oriented parallel to the longitudinal axis of the fishing float or oriented at an angle to the longitudinal axis of the fishing float.

6. The fishing float of claim 1, wherein the top section overlies the upper end of the tube section such that the upper end of the tube section is substantially covered.

7. The fishing float of claim 6, further comprising a slit on an upper surface of the top section through which the handle extends.

8. The fishing float of claim 1, wherein the tube section is made of one or more of a foam material and/or a hollow plastic tube.

9. The fishing float of claim 1, wherein the one or more marker devices are comprised of one or more of light sticks, flags, viz sticks, reflective surfaces, and/or chemiluminescent and phosphorescent materials.

10. The fishing float of claim 1, wherein the tube section has a length of from about 12 inches to about 24 inches and a diameter of from about 1 inch to about 5 inches.

11. A substantially hollow fishing float comprising a top end, a middle section and a bottom end, wherein:
   a. the top end has an upper outer surface and a lower circumferential edge;
   b. the middle section having an inner surface, an outer surface, an upper circumferential edge and a lower circumferential edge, wherein the upper circumferential edge of the middle section is integrally connected to the lower circumferential edge of the top section;
   c. the bottom end positioned at an end opposite to the top end, the bottom end having a removable closure; and
   d. a circular band having an inner surface and an outer surface, configured such that the inner surface overlies at least a portion of the outer surface of the middle section or the lower circumferential edge of the top end, wherein the circular band comprises one or more holding members, each holding member having an opening to a channel configured to receive a tubular shaped marker device, each holding member extending along the outer surface of the circular band, the one or more channels having an inner surface.

12. The fishing float of claim 11, wherein the fishing float further comprises a handle extending from the upper outer surface of the top end.

13. The fishing float of claim 11, wherein the fishing float further comprises a neck having a substantially tapered outer surface with an upper circumferential edge and a lower circumferential edge, the upper circumferential edge being larger in circumference than the lower circumferential edge, wherein the upper circumferential edge of the neck is connected to the lower circumferential edge of the middle section and the lower circumferential edge being connected to the bottom end, further comprising an opening extending from the neck and/or bottom end and configured for receiving a fishing line.

14. The fishing float of claim 11, wherein the middle section is generally cylindrical in shape.

15. The fishing float of claim 11, wherein the fishing float further comprises a mounting device having a channel to retain a marker or lighting device.

16. The fishing float of claim 11, further comprising one or more marker devices positioned within the one or more holding members such that a portion of an outer surface of the one or more marker devices is positioned within the channel.

17. The fishing float of claim 16, wherein the one or more marker devices comprise an illuminating device.

18. The fishing float of claim 12, wherein the handle is free of any marker device.

19. The fishing float of claim 11, wherein three holding members are positioned along the outer surface of the circular band such that each holding member is separated by 120°.

20. The fishing float of claim 11, wherein the one or more channels are oriented parallel to the longitudinal axis of the fishing float or oriented at an angle to the longitudinal axis of the fishing float.

* * * * *